Dec. 27, 1966  W. J. CALDWELL ETAL  3,293,738
PLASTIC RETAINER ASSEMBLY MACHINE AND METHOD
Filed Jan. 10, 1962  5 Sheets-Sheet 1
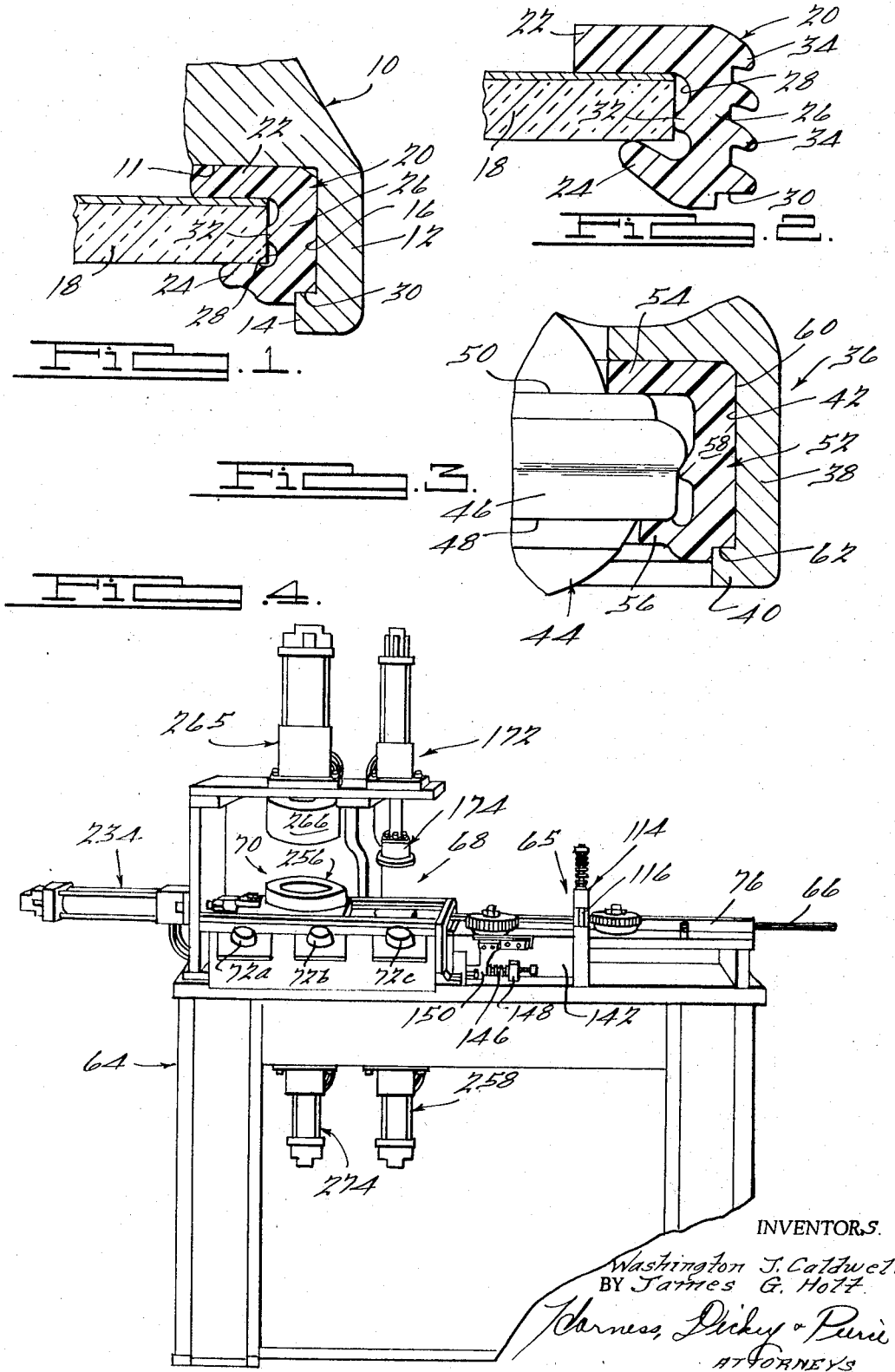
INVENTORS.
Washington J. Caldwell
BY James G. Hott
Harness, Dickey & Pierce
ATTORNEYS Dec. 27, 1966    W. J. CALDWELL ETAL    3,293,738
PLASTIC RETAINER ASSEMBLY MACHINE AND METHOD
Filed Jan. 10, 1962    5 Sheets-Sheet 2
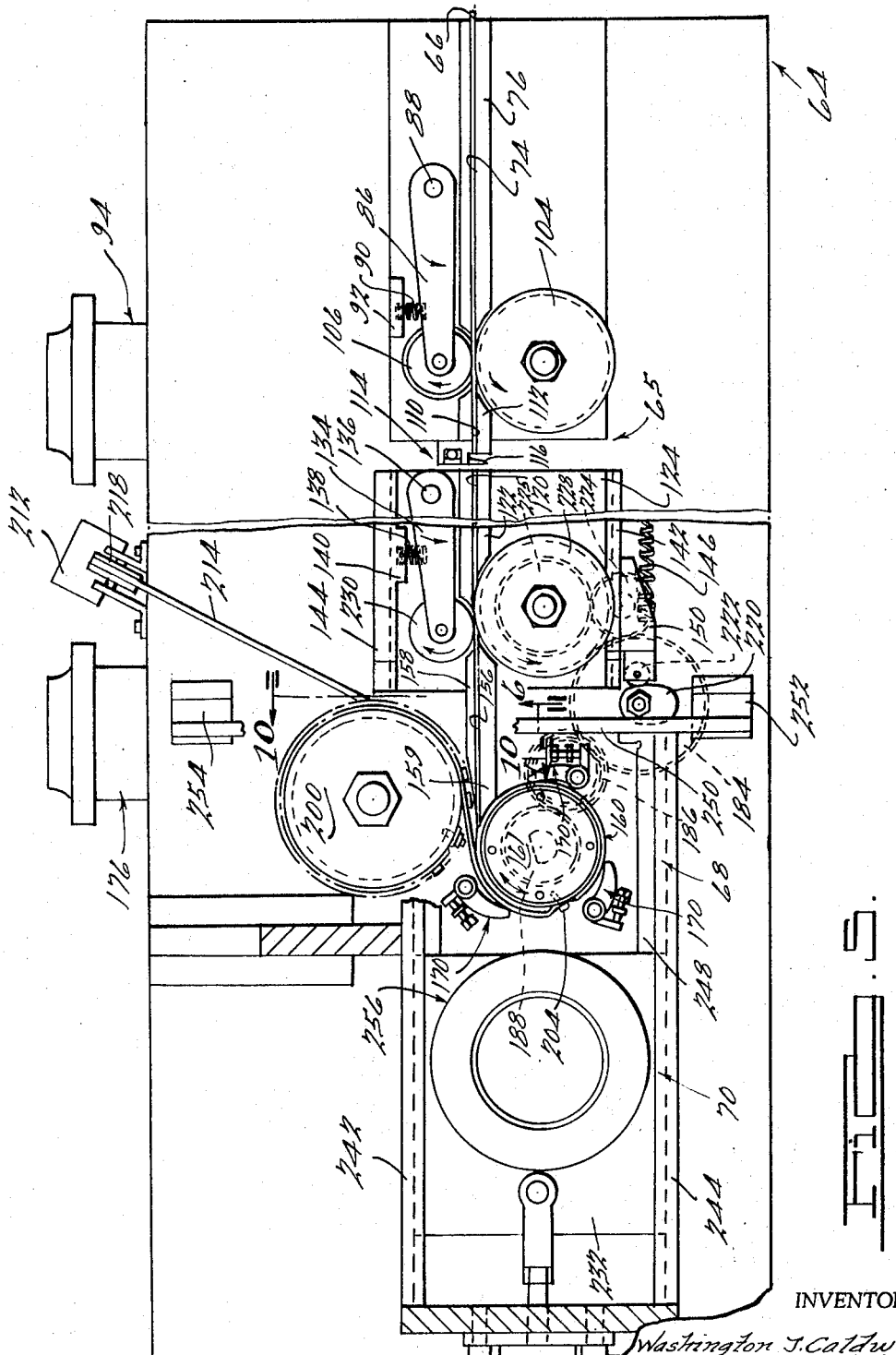
INVENTORS.
Washington J. Caldwell
BY James G. Holt.
Harness, Dickey & Pierce
ATTORNEYS

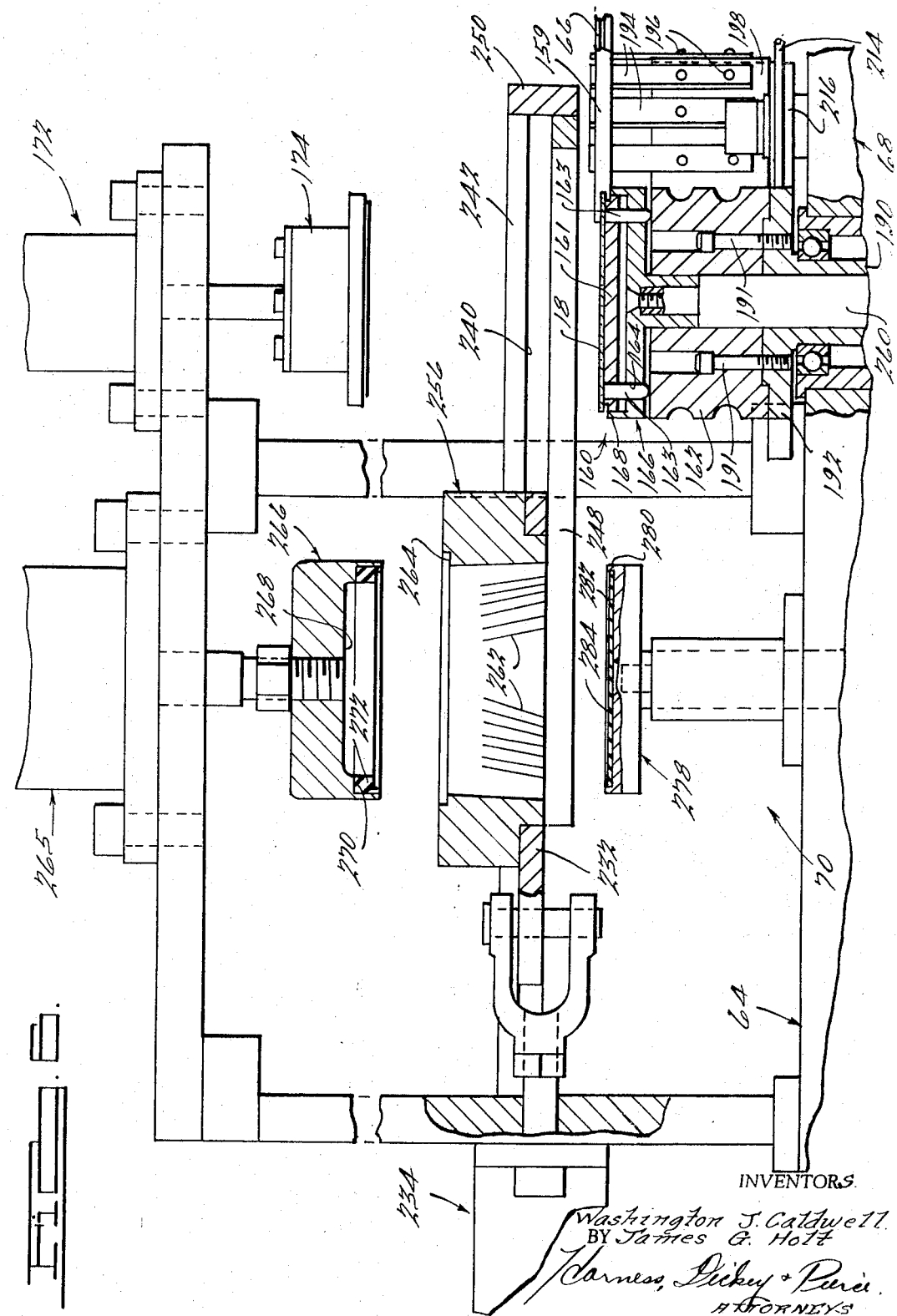

Dec. 27, 1966  W. J. CALDWELL ETAL  3,293,738
PLASTIC RETAINER ASSEMBLY MACHINE AND METHOD
Filed Jan. 10, 1962  5 Sheets-Sheet 4
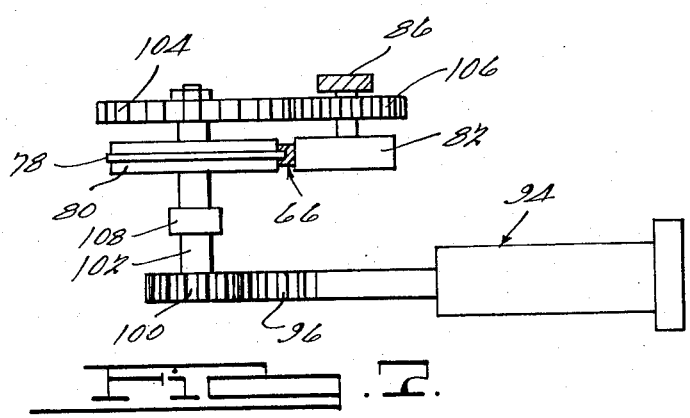
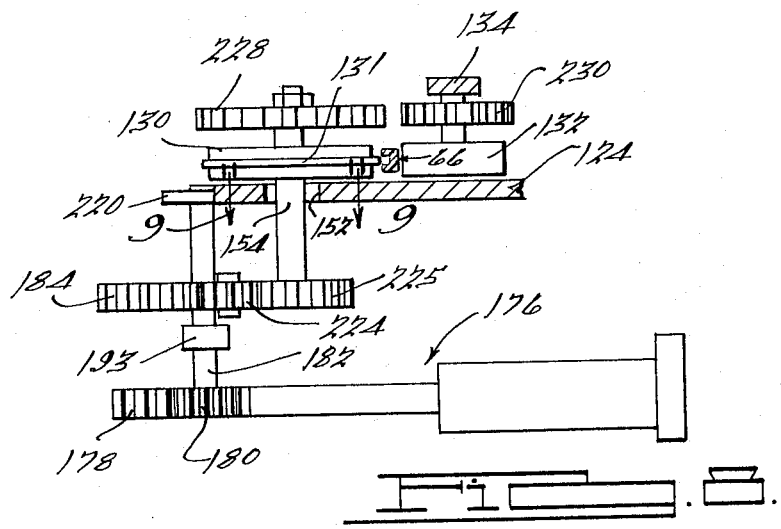
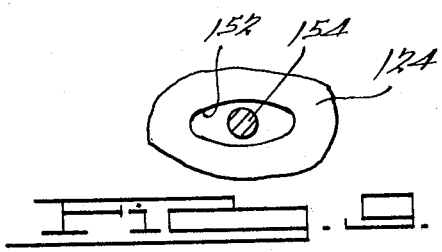
INVENTORS.
Washington J. Caldwell.
James G. Holt.
BY
James, Dickey + Pierce
ATTORNEYS.

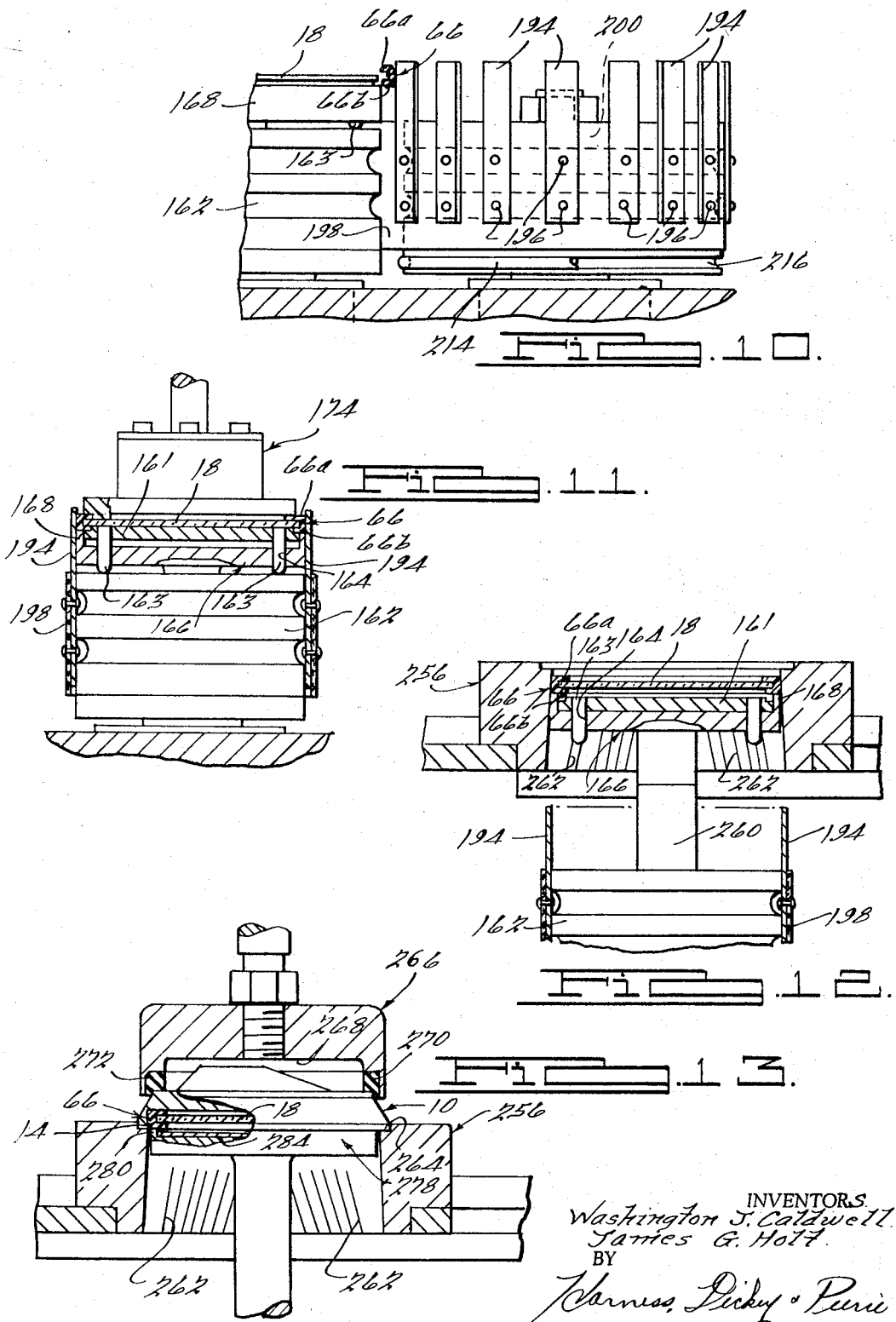

United States Patent Office 3,293,738
Patented Dec. 27, 1966

3,293,738
PLASTIC RETAINER ASSEMBLY MACHINE
AND METHOD
Washington J. Caldwell, Garden City, and James G. Holt, Dearborn, Mich., assignors to C. M. Hall Lamp Company, Detroit, Mich., a corporation of Michigan
Filed Jan. 10, 1962, Ser. No. 165,454
37 Claims. (Cl. 29—451)

This invention relates to machines for and an improved method of securing fragile elements in a housing by means of a plastic retainer.

Objects of this invention are to mass-produce assemblies having a fragile element and a plastic retainer which secures the fragile element in a housing while insulating the fragile element against mechanical shock transmitted through the housing; to produce such assemblies by means of an improved machine; to construct such an improved machine including means for securing the plastic retainer on the periphery of the fragible element and further including means for compressing the plastic retainer on the periphery of the fragile element while taking up or stretching the plastic retainer to form a continuous band on the periphery of the fragile element; to construct such an improved machine including means for holding the plastic retainer on the periphery of the fragile element and for freely moving the plastic retainer and fragile elements into a hollow supporting housing until the plastic retainer securely engages the inner surface of the hollow supporting housing; to construct such an improved machine including means for applying a force on the plastic retainer to move the fragile element and the plastic retainer into the hollow supporting housing without imposing a direct force on the fragile element as it is secured within the hollow supporting housing by the plastic retainer; and to construct such an improved machine including means to secure a first plastic retainer on a first fragile element while a second fragile element and a second plastic retainer are being assembled in a hollow supporting housing.

Further objects of this invention are to improve the method of securing a fragile element in a hollow supporting housing by means of a plastic retainer.

The manner of accomplishing the foregoing objects and other objects, features and advantages of the present invention will become apparent from the subsequent description, taken in conjunction with the accompanying drawings, in which:

FIGURE 1 is a view in vertical section of a portion of a unit assembled in accordance with certain of the principles of the present invention;

FIGURE 2 is a view in vertical section of portions of the fragile element and plastic retainer of the unit illustrated in FIGURE 1 before they are assembled in the hollow supporting housing;

FIGURE 3 is a view in vertical section of a portion of a modified unit assembled in accordance with certain of the principles of the present invention;

FIGURE 4 is a view in perspective of one embodiment of a machine, constructed in accordance with certain of the principles of the present invention, and adapted to assemble units such as those illustrated in FIGURES 1–3;

FIGURE 5 is a plan view of the machine illustrated in FIGURE 4 with fluid cylinder and piston units being omitted for clarity;

FIGURE 6 is an enlarged view in vertical section taken substantially along the line 6—6 of FIGURE 5;

FIGURE 7 is a diagrammatic side elevational view of the principal components of first plastic retainer feed means;

FIGURE 8 is a diagrammatic side elevational view of the principal components of second plastic retainer feed means;

FIGURE 9 is a view in horizontal section taken substantially along the line 9—9 of FIGURE 8;

FIGURE 10 is a view in vertical section taken substantially along the line 10—10 of FIGURE 5;

FIGURE 11 is a view in vertical section of the principal components of means for locating a plastic retainer on the periphery of a fragile element;

FIGURE 12 is a view in vertical section of the principal components of means for compressing a plastic retainer on the periphery of a fragile element; and FIGURE 13 is a view in vertical section of the principal components of means for inserting a fragile element and plastic retainer into a hollow supporting housing.

The machine and method of the present invention are particularly adapted to mass-produce units comprising a fragile element, a plastic retainer and a hollow supporting head or housing.

One embodiment of such a unit is illustrated in FIGURES 1 and 2 as including a housing 10 having a back surface 11, a forwardly directed flange 12 and an inwardly directed flange 14 in the form of a lip formed integrally therewith to define a groove 16 which may be of circular or other geometric shape. The unit further comprises a fragile element representatively illustrated as a flat mirror 18 of the same geometric shape as the groove 16. A plastic retainer element or gasket 20 of a suitable resilient material, for example, polyvinyl chloride having a hardness of 60–70 durometers, has a pair of inwardly directed leg portions 22, 24 which are joined by an intermediate portion 26 to define a groove 28 which receives and grips the peripheral edge of the mirror 18.

The intermediate portion 26 press-fits between the peripheral edge of the mirror 18 and the inner surface of the flange 12 to insulate the mirror against mechanical shock and hold it against movement transverse to the longitudinal axis of the housing 10. The gasket 20 is also locked between the back surface 11 of the housing 10 and the inwardly directed flange 14 by means of a forward shoulder 30 on the gasket 20 which engages the flange 14 to prevent forward movement of the mirror 18 relative thereto.

The gasket 20, details of which form no part of the present invention, is described in greater detail in application No. 75,379, filed December 12, 1960, now Patent No. 3,171,886, by Drew S. Holt et al., for Mirror Retaining Means, as including a radially inwardly directed protrusion 32 and a plurality of radially outwardly directed fingers 34 on the intermediate portion 26. The protrusion 32, being of a smaller cross sectional area than the portion 26, is readily compressible and serves the function of taking up dimensional variations in the diameter of the mirror 18, thereby assuring peripheral contact between the outer edge of the mirror 18 and the gasket 20. The fingers 34 on the outer periphery of the gasket serve to resist movement of the mirror element 18 outwardly of the housing 10 as discussed in the above mentioned Drew S. Holt et al. application.

Another example of a unit adapted to be assembled by means of the machine and method of the present invention is illustrated in FIGURE 3 as including a housing 36 which has a forwardly directed flange 38 and inwardly directed flange 40 formed integrally therewith to define a groove 42 which may also be of any geometric shape. A conventional seal beam unit 44 having a peripheral bead 46 with forward and rear flanges 48, 50, respectively, is secured in the groove 42 of the housing 36 by means of a modified plastic retainer 52 comprising inwardly directed spaced legs 54, 56 interconnected by an intermediate portion 58 having a smooth outer surface 60.

The legs 54, 56 grip the bead flanges 48, 50, respectively, to hold the plastic retainer 52 on the peripheral bead 46, and the intermediate portion 58 fits in the groove 42 to hold the seal beam unit 44 in the housing 36.

The intermediate portion 58 and leg 54 of the plastic retainer 52 press-fit between the inner surface of the housing 36 and the seal beam unit 44 for insulating it against mechanical shock transmitted through the housing 36. The intermediate portion 60 also prevents movement of the seal beam unit 44 transverse to the longitudinal axis of the housing 36. Movement of the seal beam unit 44 along the longitudinal axis of the housing 36 is prevented by means of a forward shoulder 62 on the plastic retainer 52 which locks the retainer 52 between the back surface of the housing 36 and the flange 40.

It should be noted that machines constructed in accordance with certain of the concepts of the present invention and the improved method are adapted to the assembly of either of the above described units as well as other units having like elements.

The method for securing fragile elements in a housing by means of a plastic retainer, in accordance with certain principles of the invention, may be carried out by hand. The improved method accordingly comprises the steps of locating a mechanical shock insulating retaining element, for example, the plastic retainer 20 in FIGURES 1 and 2, on the periphery of a fragile element such as the mirror 18 so that the leg portions 22, 24 of the plastic retainer 20 grip the entire peripheral edge of the mirror 18. The plastic retainer 20 may be shaped as a continuous band or a strip having opposite end portions. If the plastic retainer is shaped as a strip it is pulled about the periphery of the mirror 18 until the opposite ends of the strip engage one another.

When the plastic retainer element 20 is so located it assumes a fully expanded position, as determined by its inherent resiliency, such that the planar area defined by the periphery thereof is greater than the planar area of an opening in a hollow supporting head or housing such as the opening defined by the radially inwardly directed flange 14 on the housing 10 in FIGURES 1 and 2. Thus, when the plastic retainer 20 is fully expanded, its peripheral edge overlaps the inside edge of the inwardly directed flange 14 so that the plastic retainer 20 will tend to be forced off the mirror 18 as the mirror 18 is assembled in the housing 10.

In the improved method, such a tendency for the plastic retainer 20 to be forced off the mirror 18 during the assembly of the unit is negated by compressing the plastic retainer 20 toward the mirror 18 until the planar area defined by the peripheral edge of the plastic retainer 20 is less than the planar area of the opening defined by the inwardly directed flange 14.

Once the plastic retainer 20 has been so compressed, the mirror and plastic retainer 20 are centered relative to the opening defined by the inwardly directed flange 14 and they are moved past the inwardly directed flange toward the back surface 11 on the housing 10 by means of an axial force applied on the compressed plastic retainer at a point located outwardly of the periphery of the mirror 18. Such an axial force moves the compressed plastic retainer past the inwardly directed flange 14 without imposing any substantial forces on the mirror 18.

The compressed plastic retainer 20 will not engage the outer face of the inwardly directed flange 14 as the mirror 18 is inserted into the housing 10. Therefore, the plastic retainer 20 remains located on the periphery of the mirror 18 with the inwardly directed legs 22, 24 thereof securely gripping the periphery of the mirror 18. The other portions of the plastic retainer 20 expand as they pass the inwardly directed flange 14 to press-fit between the inner surface of the housing 10 and the mirror 18 so as to retain the mirror 18 in the housing and insulate the mirror 18 against mechanical shock transmitted through the housing 10.

One embodiment of a plastic retainer assembling machine constructed in accordance with certain of the principles of the present invention is illustrated in FIGURES 4–13 as including a worktable 64 for supporting means including feed apparatus means 65 adapted to move a strip 66 of plastic retaining material to a first work station 68 having assembly means adapted to mount a predetermined portion of the strip 66 on the periphery of a fragile element such as the mirror 18 to form a mirror-gasket sub-assembly. The strip 66 preferably has leg portions 66a, 66b, FIGURE 12, similar to the leg portions 22, 24 of the plastic retainer 20 in FIGURES 1–2, for gripping the periphery of the mirror 18.

The machine further comprises a second work station 70 which includes assembly means adapted to assemble a fragile element and a plastic retainer in a housing. The machine is controlled by conventional limit switches (not shown) and control buttons 72a, 72b and 72c which are electrically interrelated in a control system of the type well known in the art.

The assembling of units such as those illustrated in FIGURES 1–3 commences by threading a continuous strip 66 of plastic retaining material, for example, into a groove 74 in a guide insert 76 of strip dispensing means mounted on the upper surface of the workable 64. The strip of plastic retaining material 66 is advanced into operative engagement with the feed apparatus means 65 at which point it engages a ridge 78 (FIG. 7) on the periphery of a rotatable drive roller 80 located on the top surface of the workable 64. The drive roller 80 coacts with an idler roller 82 carried on one end of an elongated arm 86, the opposite end of which pivots on a pin 88 secured on suitable fixed support means. A compression spring 90 mounted between a support bracket 92 and the arm 86 moves the idler roller 82 toward the drive roller 80 to press the strip 66 of plastic retaining material into frictional contact with the rotatable drive roller 80.

Once the strip 66 of plastic retaining material has been located in coacting relationship with the drive roller 80 and the idler roller 82, it is advanced by actuating means including a fluid cylinder and piston unit 94 mounted on the rear of the machine; a rack 96; a pinion 100 on one end of a shaft 102 having its opposite end connected to the drive roller 80; a gear 104 connected to the drive roller 80 and a gear 106 connected to the idler roller 82. Suitable one-way clutch means 108 are connected on the shaft 102 between the pinion 100 and the drive roller 80 so that the strip 66 will only advance in a forward direction.

The strip 66 of plastic retaining material is advanced by such drive means to gasket applying means for applying the plastic retaining material to the periphery of the mirror. The material is received in a groove 110 in a guide insert 112 mounted on the forward edge of the top surface of the worktable at a point adjacent to a severing means 114 including a knife blade 116, and thence into a groove 120 formed in a guide insert 122 mounted on the top surface of a movable plate means 124 which provides control means for controlling actuation of said gasket applying means. The guide insert 122 directs the strip 66 of plastic retaining material between a second rotatable drive roller 130 with a strip guiding ridge 131 on its periphery and an idler roller 132 which is carried on one end of an elongated arm 134 which is in turn pivotally mounted at its opposite end on a pin 136 carried on the movable plate 124. The idler roller 132 is moved toward the drive roller 130 by means of a compression spring 138 mounted between a spring bracket 140 and the arm 134.

At this point in the machine's operation, the movable plate 124 is positioned forwardly in supporting brackets 142, 144 by means of a compression spring 146 acting between a fixed bracket 148 and an upwardly directed arm 150 attached to the movable plate 124 (FIG. 4).

The movable plate 124 has an elongated groove 152 (FIG. 9) which permits it to slide relative to a shaft 154 connected to the drive roller 130 which is fixed relative to the movable plate 124. Consequently, the idler roller 132 which is mounted on the movable plate 124 is advanced forwardly of the drive roller 130. Since the idler roller 132 is positioned forwardly of the drive roller 130 there is sufficient clearance therebetween through which the strip 66 can freely advance as it is driven forwardly by the drive roller 80 and idler roller 82. The forward end of the plastic strip 66, therefore, freely passes into a groove 156 formed in a guide insert 158 mounted on the top surface of the movable plate 124 forwardly of the drive roller 130 and the idler roller 132. The forwardmost tip of the guide insert 158 defines a feeder nozzle means 159 which is located adjacent the first work station 68 which includes means for applying the strip 66 tangentially on the periphery of a fragile element in a manner to be discussed.

When a predetermined length of plastic retaining material has passed the cutter 114 and been positioned on the gasket applying means conventional indexing means (not shown) are actuated to energize suitable solenoid means (not shown) to cause the blade 116 to move downwardly to cut the strip 66 of plastic retaining material.

The plastic retainer assembly means at the first work station includes winding means for winding the gasket around the mirror and formed in part by a rotatable cushioned support means 160 comprising a flat plate 161 which is adapted to receive a fragile element such as the mirror 18. The plate 161 may also be shaped to support other fragile elements such as a seal beam unit. The top surface of a hub portion 162 of the rotatable cushion assembly 160 supports a plurality of pins 163 connected to the flat plate 161 and directed downwardly therefrom through apertures 164 in a reciprocable plunger means 166 having tool means for applying axial force around the periphery of the gasket after it is mounted on the mirror in the form of an upwardly directed peripheral flange 168 which is spaced below the peripheral edge of the mirror 18 or the like on the flat plate 161. Thus, the peripheral edge of the mirror 18 can be gripped by the spaced legs 66a, 66b on the strip 66 of plastic retaining material as it advances from the feeder nozzle 159.

The mirror 18 is centered on the flat plate 161 by centering means consisting of a plurality of circumferentially located arms 170 (FIG. 5) which are spring-biased radially inwardly by means of suitable compression springs.

Once the mirror element 18 has been centered, a fluid cylinder and piston unit 172 moves a back up means in the form of a stabilizing head 174 having a contoured periphery corresponding to the upper leg 66a of the gasket and terminating inwardly of the outer periphery of the gasket, as shown in FIGURE 11, and being movable downwardly to secure the mirror 18 in place.

The strip 66 of plastic retaining material is then applied to the periphery of the mirror 18 between the locating groove defined by the flange 168 and the head 174 by rotating the cushion plate 161 by drive means (FIG. 8) including a fluid cylinder and piston unit 176 mounted on the rear of the machine; a rack 178 on the cylinder piston unit 176; a pinion 180 connected to one end of a shaft 182; a main drive gear 184; an idler gear 186 (FIG. 5); and a gear 188 connected to one end of a hollow shaft 190 which connects to the hub 162 of the rotatable cushion assembly 160. The hub 162 is concentrically located with respect to and connected to the shaft 190 by means of elongated screws 191 which threadingly engage an upper flange portion 192 on the shaft 190. Suitable one-way clutch means 193 disconnect the drive means from the drive gear 184 during the return stroke of the cylinder piston unit 176.

During rotation of the cushion assembly 160 the plastic retaining strip 66 is pressed on the periphery of the mirror 18 by clamping means in the form of a plurality of vertical staves 194 fastened by means of rivets 196 or the like to suitable carrier means such as a belt 198 having one end connected to the periphery of a rotatable wheel 200 and having its opposite end attached to the hub 162 of the rotatable cushion assembly 160 by means of screws 204.

As the rotatable cushion assembly 160 starts to rotate, the staves 194 are fully wound on the periphery of the rotatable wheel 200 by means of a weight 212 connected to one end of a rope 214 having its opposite end connected to the periphery of a sheave 216 which in turn connects to the wheel 200. The rope 214 passes across a pulley 218 located on an upper rear portion of the machine so that the weight 212 imposes a pull on the rope 214 to hold the belt 198 and staves 194 on the periphery of the wheel 200. When the staves 194 are located on the wheel 200, as illustrated in FIGURES 5 and 10, there is sufficient clearance between the belt 198 and the periphery of the mirror 18 to enable the feed nozzle 159 to fit therebetween at which point the nozzle 159 will be tangent to the periphery of the mirror 18 so that the leg portions 66a, 66b on the plastic retaining strip 66 will be in engagement with the top and bottom surfaces of the mirror element 18, respectively.

Thus the winding means is effective during rotation of the cushion assembly 160 to wind the belt 198 from the periphery of the wheel 200 onto the periphery of the hub 162 to move the staves 194 into uniform engagement with the spaced portions of entire periphery of plastic retaining strip 66 for guiding it onto the periphery of the mirror 18 (FIG. 11).

Common actuating means are provided for the winding means and the gasket applying means so that as the rotatable support is rotated the staves 194 start to move tangent to the periphery of the hub 162 and means including a cam 220 operatively connected to the main drive gear 184 rotates to engage a cam follower 222 carried on the upwardly directed arm portion 150. The cam 220 moves the arm portion 150 rearwardly along with the movable plate 124 to shift the nozzle 159 to a position in which it is spaced from the periphery of the mirror 18 to provide sufficient clearance for the staves 194 to pass into engagement with the plastic retaining strip 66 on the periphery of the mirror 18.

As the movable plate 124 moves rearwardly, the clearance between the idler roller 132 and the drive roller 130 is reduced until they coact to drive the previously cut strip 66 of plastic retaining material forwardly by actuating means including the fluid cylinder piston until 176; the rack 178; the pinion 180; the main drive gear 184; and idler gear 224; a gear 225 which connects to one end of the shaft 154; a gear 228 connected to the drive roller 130 and a gear 230 connected to the idler roller 132. The concurrent forward movement of the plastic retaining strip 66 and the radially inwardly pressing action of the staves 194 and the belt 198 assures that the plastic retaining strip 66 will be uniformly secured on the periphery of the mirror 18.

The cushion assembly 160 will continue to rotate until the preselected length of plastic retaining material 66 is completely wound on the periphery of the mirror 18. Then the fluid cylinder and piston unit 172 moves the stabilizing head 174 upwardly away from the mirror 18 and transfer means for moving the mirror-gasket subassembly between work stations in the form of a movable plate 232 is positioned over the mirror 18 by means of a fluid cylinder and piston unit 234 operatively connected thereto. The plate 232 slides in grooves 240 as defined by brackets 242, 244 and a bottom slide frame 248 until it engages a stop 250 located on vertical supports 252, 254 fixedly mounted on the worktable 64 (FIG. 5). A special fixture means 256, in the form of a hollow tapered element, is mounted on the plate 232 for receiving the mirror-gasket sub-assembly and holding the gasket in its uniformly mounted position on the mirror during transfer from the first work station to the second work station. The fixture means is also adapted to provide a special loading function at the second work station and comprises a tapered passageway having a cross sectional configuration corresponding to that of the mirror-gasket sub-assembly with an inlet opening at one end larger than the outer periphery of the mirror-gasket sub-assembly and an outlet opening at the other end smaller than the gasket but larger than the mirror and approximately equal to or slightly smaller than the opening in the housing which is defined by the inner periphery of the lip in front of the groove in the housing. When the movable plate 232 is positioned over the work station 68, hollow tapered element 256 on the plate 232 is concentrically aligned with the mirror 18.

The plunger means at the first work station forms part of loading means for loading the mirror-gasket sub-assembly in the tapered passageway. A fluid cylinder and piston unit 258 forces a shaft 260 attached to the retainer 166 upwardly to move the mirror 18 and the plastic retaining strip 66 on the periphery thereof into the hollow tapered element 256 (FIG. 12). Such movement causes the retainer 166 to engage the underside of the flat plate 161 and raise the pins 163 away from the top surface of the hub 162. The upwardly directed peripheral flange portion 168 of the retainer 166 will then engage the plastic retaining strip 66 on the periphery of the mirror 18 along an annular area located radially outwardly of the periphery of the mirror 18 and lift the mirror 18 away from the flat plate 161.

Therefore, in accordance with certain of the concepts of the present invention, the only force moving the mirror 18 into the element 256 is applied on the plastic retaining strip 66. Since there is no metal-to-glass contact during the movement of the mirror 18 into the hollow tapered element 256, the possibility of glass breakage is reduced materially.

The hollow tapered element 256 has a plurality of circumferentially located grooves 262 on its inner surface which reduce friction between the inner surface and the periphery of the plastic retaining strip 66 as the mirror 18 is inserted therein. Furthermore, such grooves 262 provide stretching means to pull the ends of the plastic retaining strip 66 together as the mirror 18 is inserted to eliminate any gap in the plastic retaining strip 66 through which foreign material might pass into the housing of an assembled unit.

Once the mirror 18 is secured within the hollow tapered element 256, the shaft 260 moves downwardly and then the plate 232 moves to the left to position the mirror 18 adjacent the second work station 70. Then a housing or head, such as the housing 10 in FIGURES 2 and 3, is inserted in a counterbore 264 in the top of the tapered hollow element 256.

After the return of the tapered hollow element 256 to the second work station 70, the belt 198 is rewound on the wheel 200, another fragile element is placed on the cushion assembly 160 and the feed nozzle 159 is again moved forwardly to a point tangent to the fragile element on the cushion assembly 160.

The housing 10 is then held downwardly on the hollow tapered element 256 by housing holding means of a fluid cylinder and piston unit 265 connected to a housing stabilizer 266 having a hollow portion 268 which receives the rear portion of the housing 10 and a shoulder 270 which supports a resilient member 272 adapted to bear against the housing 10 without damaging the surface thereof.

The mirror-gasket sub-assembly 18 is then inserted into the housing 10 by loading means of a fluid cylinder and piston unit 274 and a plunger means 278 comprising an upwardly directed peripheral flange portion 280 which defines a recess 282 which receives a resilient cushion 284 that contacts the downwardly directed surface of the mirror 18 mounted in the tapered hollow element 256. As best illustrated in FIGURE 13, the flange 280 provides a force applying tool which engages the plastic retaining strip 66 outwardly of the periphery of the mirror 18 to force the mirror 18 out of the tapered hollow element 256 and into the housing 10. Thus, there is no metal-to-glass contact and mirror breakage is substantially negated.

Upward movement of the plunger means 278 will move the mirror 18 out of the hollow tapered element 256 which continually compresses the plastic retaining strip 66 toward the periphery of the mirror 18 so that when the mirror 18 enters the housing 10 the plastic retaining strip 66 will not engage the outer face of the flange 14 on the housing 10. Thus, the plastic retaining strip 66 will not roll off of the mirror 18 and its legs 66a, 66b will continue to securely grip the periphery of the mirror 18. The other portions of the plastic retaining strip 66 expand as they pass the inwardly directed flange 14 to press-fit between the inner surface of the housing 10 and the mirror 18 so as to retain the mirror 18 in the housing 10 and insulate the mirror 18 against mechanical shock transmitted through the housing 10. When the mirror 18 is firmly secured with respect to the housing 10, the plunger means 278 is moved downwardly conjointly with movement of the housing stabilizer 266 upwardly so that the assembled unit can be removed from the work station 70. At this point another plastic retaining strip has been wound on the periphery of another mirror at work station 68 and the hollow tapered element 256 is moved to the right into a position overlying the glass cushion assembly 160 in preparation for the remainder of the assembling sequence as already discussed.

It will be understood that the specific machine apparatus and specific methods which are herein disclosed and described are intended to be illustrative of the inventive principles and the scope of the invention is defined by the following claims.

What is claimed is:

1. A method for assembling a resilient plastic retainer between a fragile element and the inner surface of a housing having an opening therein which is larger than the element and smaller than the resilient retainer, comprising the steps of locating a length of resilient retainer on the periphery of an element, aligning the element and the resilient retainer with respect to the opening in the housing, uniformly peripherally compressing the resilient retainer against the element until it is smaller than the opening in the housing by applying axial force directly on the resilient retainer and moving the compressed resilient retainer through the opening and into the housing by translational motion, and simultaneously carrying the element with the resilient retainer through the opening and into the housing.

2. A method for assembling a resilient plastic retainer between a fragile element and the inner surface of a housing having an opening therein which is larger than the element and smaller than the resilient retainer, comprising the steps of locating a length of resilient plastic retainer on the periphery of a fragile element, aligning the element and resilient retainer with respect to the opening in the housing, compressing the resilient retainer against the element until it is smaller than the opening in the housing, and applying force on the compressed resilient retainer outwardly of the periphery of the element to move the element and compressed resilient retainer through the opening and into the housing without imposing the force directly on the element.

3. A method for assembling a resilient plastic retainer between a fragile element and the inner surface of a housing having an opening therein which is larger than the element and smaller than the resilient retainer, comprising the steps of locating a length of resilient plastic retainer on the periphery of a fragile element, aligning the element and the resilient retainer with respect to the opening in the housing, compressing the resilient retainer against the element until it is smaller than the opening in the housing, applying force on the compressed resilient retainer outwardly of the periphery of the element for moving the element and compressed resilient retainer through the opening and into the housing without imposing the force directly on the element, and expanding the resilient retainer after it has passed through the opening until it engages the inner surface of the housing to resiliently support and retain the element with respect to the housing.

4. A method for assembling a resilient plastic retaining strip between a fragile element and the inner surface of a housing having an opening therein which is larger than the element and smaller than the resilient retaining strip, comprising the steps of cutting a resilient plastic retaining strip to a predetermined length, locating the resilient retaining strip on the periphery of a fragile element, aligning the element and the resilient retaining strip with respect to the opening in the housing, engaging said resilient retaining strip with a separate assembly tool, compressing the resilient retaining strip against the element in an assembly fixture until it is smaller than the opening in the housing, and applying axial force directly on the compressed resilient retaining strip through said separate assembly tool to move the element and the compressed resilient retaining strip out of the assembly fixture through the opening and into the housing.

5. A method for assembling a resilient plastic retaining strip between a fragile mirror element and the inner surface of a housing having an opening therein which is larger than the element and smaller than the resilient retaining strip, comprising the steps of cutting a resilient plastic retaining strip to a predetermined length, locating the resilient retaining strip on the periphery of a fragile mirror element taking up the resilient retaining strip around the periphery of the element until the ends thereof are in abutting relationship, aligning the element and resilient retaining strip with respect to the opening in the housing, compressing the resilient retaining strip against the element until it is smaller than the opening in the housing, and applying force on the compressed resilient retaining strip to move the element and the compressed resilient retaining strip through the opening and into the housing.

6. A method for assembling a resilient plastic retaining strip between a fragile element and the inner surface of a housing having an opening therein which is larger than the element and smaller than the resilient retaining strip comprising the steps of cutting the resilient retaining strip to a predetermined length less than the peripheral length of said element, winding the resilient retaining strip on the periphery of an element with the ends of the strip in spaced relationship, aligning the element and the resilient retaining strip with respect to the opening in the housing, compressing the resilient retaining strip against the element until it is smaller than the opening in the housing and forcing the ends of the retaining strip into abutting engagement, applying force directly on the compressed resilient retaining strip to move the element and compressed resilient retaining strip through the opening and into the housing, and expanding the resilient retaining strip after it has passed through the opening until it engages the inner surface of the housing to resiliently support and retain the element with respect to the housing with the ends of the strip still in substantially abutting relationship.

7. A method for assembling a resilient retaining plastic strip between a fragile element and the inner surface of a housing having an opening therein which is larger than the element and smaller than the resilient retaining strip comprising the steps of cutting a resilient retaining strip to a predetermined length, winding the resilient retaining strip on the periphery of an element, taking up the resilient retaining strip around the periphery of the element until the ends thereof are in abutting relationship, aligning the element and the resilient retaining strip with respect to the opening in the housing, confining the periphery of said strip in an assembly fixture having a tapered passage and compressing the resilient retainer against the element in the assembly fixture until it is smaller than the opening in the housing, applying force on the compressed resilient retaining strip to move the element and the compressed resilient retaining strip from the assembly fixture through the opening and into the housing, and expanding the resilient retaining strip after it has passed through the opening until it engages the inner surface of the housing to resiliently support and retain the element with respect to the housing.

8. A method for assembling a resilient plastic retaining strip between a fragile element and the inner surface of a housing having an opening therein which is larger than the element and smaller than the resilient retaining strip, comprising the steps of cutting the resilient plastic retaining strip to a predetermined length, locating the resilient retaining strip on the periphery of a fragile element, aligning the element and the resilient retaining strip with respect to the opening in the housing, compressing the resilient retaining strip against the element until it is smaller than the opening in the housing, and applying force on the compressed resilient retaining strip at a point outwardly of the periphery of the element for moving the element and compressed resilient retaining strip through the opening and into the housing without imposing the force directly on the element.

9. A method of assembling a resilient plastic retaining strip between a fragile element and the inner surface of a housing having an opening therein which is larger than the element and smaller than the resilient retaining strip, comprising the steps of cutting resilient plastic retaining strip to a predetermined length, locating the resilient retaining strip on the periphery of a fragile element, taking up the resilient retaining strip around the periphery of the element until the opposite ends thereof are in abutting relationship, aligning the element and the resilient retaining strip with respect to the opening in the housing, compressing the resilient retaining material against the element until it is smaller than the opening in the housing, and applying force on the compressed resilient retaining strip outwardly of the periphery of the element for moving the element and the compressed resilient retaining strip through the opening and into the housing without imposing the force directly upon the element.

10. A method for assembly a resilient plastic retaining strip between a fragile element and the inner surface of a housing having an opening therein which is larger than the element and smaller than the resilient retaining strip, comprising the steps of cutting the resilient plastic retaining strip to a predetermined length, winding the resilient retaining strip on the periphery of a fragile element, taking up the resilient retaining strip around the periphery of the element until the opposite ends thereof are in abutting relationship, aligning the element and the resilient retaining strip with respect to the opening in the housing, compressing the resilient retaining strip against the element until it is smaller than the opening in the housing, applying force on the compressed resilient retaining strip outwardly of the periphery of the element for moving the element and compressed resilient retaining strip through the opening and into the housing without imposing the force directly on the element, and expanding the resilient retaining strip after it has passed through the opening until it engages the inner surface of the housing to resiliently support and retain the element in the housing.

11. A machine for assembling a resilient plastic retainer between a fragile element and the inner surface of a housing having an opening therein which is larger than the element and smaller than the resilient retainer comprising, means for locating a length of resilient retainer on the periphery of an element, fixture means for uniformly confining the periphery of said retainer, means for aligning the element and the resilient retainer with respect to an opening in a housing tool, means for forcing said retainer and said element into said fixture means and compressing the resilient retainer against the element in said fixture means until it is smaller than the opening in the housing, and means for applying force directly on the compressed resilient retainer to move the element and the compressed resilient retainer through the opening and into the housing where the resilient retainer will expand to engage the inner surface of the housing for resiliently supporting and retaining the element in the housing.

12. A machine for assembling a resilient plastic retainer between a fragile element and the inner surface of a housing having an opening therein which is larger than the element and smaller than the resilient retainer comprising, means for cutting a length of resilient retaining material, means for locating the length of resilient retaining material on the periphery of an element, means for aligning the element and the resilient retaining material with respect to an opening in a housing, separate fixture means for supporting the retainer and the element and for compressing the resilient retaining material against the element until it is smaller than the opening in the housing, and separate plunger means for applying force directly on the compressed resilient retaining material in the fixture to move the element and the compressed resilient retaining material through the opening and into the housing where the resilient retaining material will expand to engage the inner surface of housing to resiliently support and retain the element in the housing.

13. A machine for assembling a resilent plastic retainer between a fragile element and the inner surface of a housing having an opening therein which is larger than the element and smaller than the resilient retainer comprising, means for cutting a length of resilient retaining material, means for winding the length of resilient retaining material on the periphery of an element, means for aligning the element and the resilient retaining material with respect to an opening in a housing separate fixture means for compressing the resilient retaining material against the element until it is smaller than the opening in the housing, and means for applying force on the compressed resilient retaining material to move the element and the compressed resilient retaining material from the separate fixture means through the opening and into the housing where the resilient retaining material will expand to engage the inner surface of the housing to resiliently support and retain the element in the housing.

14. A machine for assembling a resilient plastic retainer between a fragile element and the inner surface of a housing having an opening therein which is larger than the element and smaller than the resilient retainer comprising, means for cutting a length of resilient retaining material, means for locating the length of resilient retaining material on the periphery of an element, means for aligning the element and the resilient retaining material with respect to an opening in a housing, separate means for compressing the resilient retaining material against the element until it is smaller than the opening in the housing including means for taking up the resilient material on the periphery of the element until the ends of the length of resilient retaining material are in abutting relationship, and means for applying force on the compressed resilient retaining material to move the element and the compressed resilient retaining material through the opening and into the housing where the resilient retaining material will expand to engage the inner surface of the housing to resiliently support and retain the element in the housing.

15. A machine for assembling a resilient plastic retainer between a fragile element and the inner surface of a housing having an opening therein which is larger than the element and smaller than the resilient retainer comprising, means for cutting a length of resilient retaining material, means for winding the length of plastic retaining material on the periphery of an element, means for aligning the element and the resilient retaining material with respect to an opening in a housing, means for compressing the resilient retaining material against the element until it is smaller than the opening in the housing including means for taking up the length of resilient material on the periphery of the element until the opposite ends of the length of material are in abutting relationship, and means for applying force directly on the compressed resilient retaining material to translate the compressed resilient retaining material through the opening and into the housing, said resilient retaining material carrying said element through the opening and into the housing where the resilient retaining material expands to engage the inner surface of the housing to resiliently support and retain the element in the housing.

16. A machine for assembling a resilient plastic retainer between a fragile element and the inner surface of a housing having an opening therein which is larger than the element and smaller than the resilient retainer comprising, means for locating a length of resilient plastic retainer on the periphery of a fragile element, means for aligning the element and resilient retainer with respect to an opening in a housing, means for compressing the resilient retainer against the element until it is smaller than the opening in the housing, and means for applying force on the compressed resilient retainer outwardly of the periphery of the element for moving the element and the compressed resilient retainer through the opening and into the housing without imposing the force directly on the element while allowing the resilient retainer to expand and engage the inner surface of the housing to resiliently support and retain the element in the housing.

17. A machine for assembling a resilient plastic retainer between a fragile element and the inner surface of a housing having an opening therein which is larger than the element and smaller than the resilient retainer comprising, means for cutting a length of resilient plastic retaining material, means for locating the length of resilient retaining material on the periphery of a fragile element, means for aligning the element and the resilient retaining material with respect to an opening in a housing, means for compressing the resilient retaining material against the element until it is smaller than the opening in the housing, and means for applying force on the compressed resilient retaining material outwardly of the periphery of the element for moving the element and the compressed resilient retaining material through the opening and into the housing without imposing the force directly on the element while allowing the resilient retaining material to expand and engage the inner surface of the housing to resiliently support and retain the element in the housing.

18. A machine for assembling a resilient plastic retainer between a fragile element and inner surface of a housing having an opening therein which is larger than the element and smaller than the resilient retainer comprising, means for cutting a length of resilient plastic retaining material, means for winding the length of resilient retaining material on the periphery of a fragile element, means for aligning the element and the resilient retaining material with respect to an opening in a housing, means for compressing the resilient retaining material against the element until the resilient retaining material is smaller than the opening in the housing, and means for applying force on the compressed resilient retaining material outwardly of the periphery of the element for moving the element and the compressed resilient retaining material through the opening and into the housing without imposing the force directly on the element while allowing the resilient retaining material to expand and engage the inner surface of the housing to resiliently support and retain the element in the housing.

19. A machine for assembling a resilient plastic retainer between a fragile element and the inner surface of a housing having an opening therein which is larger than the element and smaller than the resilient retainer comprising, means for cutting a length of resilient plastic retaining material, means for locating the length of resilient retaining material on the periphery of a fragile element, means for aligning the elements and the resilient retaining material with respect to the opening in the housing, means for compressing the resilient retaining material against the element until the resilient retaining material is smaller than the opening in the housing including means for taking up the length of resilient retaining material on the periphery of the element until the opposite ends of the length are in abutting relationship, and means for applying force on the compressed resilient retaining material outwardly of the periphery of the element for moving the element and the compressed resilient retaining material through the opening and into the housing without imposing the force directly on the element while allowing the resilient retaining material to expand and engage the inner surface of the housing to resiliently support and retain the element in the housing.

20. A machine for assembling a resilient plastic retainer between a fragile element and the inner surface of a housing having an opening therein which is larger than the element and smaller than the resilient retainer comprising, means for cutting a length of resilient plastic retaining material, means for winding the length of resilient retaining material on the periphery of a fragile element, means for aligning the element and the resilient retaining material with respect to the opening in the housing, means for compressing the resilient retaining material against the element until the resilient retaining material is smaller than the opening in the housing including means for taking up the length of resilient material on the periphery of the element until its opposite ends are in an abutting relationship, and means for applying force on the compressed resilient retaining material outwardly of the periphery of the element for moving the element and the compressed resilient retaining material through the opening and into the housing without imposing the force directly on the element while allowing the resilient retaining material to expand and engage the inner surface of the housing to resiliently support and retain the element in the housing.

21. The method of assembling a fragile element such as a mirror and a length of resilient plastic gasket mounted on the periphery thereof in a housing by simultaneous movement of both the mirror and the gasket through an opening in said housing smaller than said gasket and larger than said mirror to a retaining groove adapted to compressively seat said gasket and retain said mirror comprising the steps of applying axially directed forces on the length of gasket mounted on the mirror to cause translational movement thereof into said housing, compressing said gasket on the mirror until said gasket is smaller than said opening, moving said compressed gasket on the mirror axially inwardly into alignment with said groove, and expanding said gasket into said groove to locate said mirror in compressibly retained position in said housing.

22. The method of applying a resilient plastic gasket material about the periphery of a fragile element such as a mirror comprising the steps of severing a predetermined length of said gasket material sufficient to be wrapped around said element without overlap, locating one end of said length of gasket material adjacent to and in spaced relation to the periphery of said mirror, rotating said mirror relative to said length of gasket material and simultaneously feeding the one end of said gasket material tangentially toward the periphery of said mirror to wind the gasket material around the periphery of said mirror, and successively clamping portions of said gasket material to the periphery of said mirror as said gasket material is fed adjacent thereto to wind said gasket material uniformly around said mirror.

23. The method of applying a resilient plastic gasket material about the periphery of a fragile element such as a mirror comprising the steps of cutting a length of gasket material from a continuous supply of gasket material, positively driving said length of said gasket material to a winding position adjacent said mirror, loosely holding said gasket material in said winding position, rotating said mirror and simultaneously drivingly engaging said length of gasket material to drive said gasket material onto the periphery of said element, and clamping successive portions of said length of gasket material onto the rotating mirror around the entire periphery of said mirror.

24. The method of applying a resilient plastic gasket material having a channel adapted to receive the periphery of a fragile element such as a mirror comprising the steps of positioning a predetermined length of gasket material adjacent the periphery of said mirror, rotating said mirror relative to said gasket material, driving said gasket material onto said rotating mirror, positively opening the channel of said gasket material prior to contact with said rotating mirror immediately adjacent the periphery of said rotating mirror, directing said gasket material into a confining groove adjacent the periphery of said rotating mirror and clamping said gasket material onto the periphery of said rotating mirror.

25. The method of assembling a resilient plastic gasket material on the periphery of a fragile element such as a mirror and of mounting said gasket material and said mirror in a confining housing comprising the steps of mounting a length of said gasket material on said mirror to form a mirror-gasket sub-assembly, holding said gasket material on said mirror and forcing said mirror-gasket sub-assembly into a loading fixture while compressing said gasket on said mirror, transporting said mirror-compressed gasket sub-assembly to said housing in said loading fixture, and then forcing said mirror-compressed gasket sub-assembly out of said loading fixture and into said housing.

26. The method of applying a resilient plastic gasket material about the periphery of a fragile element such as a mirror comprising the steps of temporarily defining a groove approximately equal to the width of said gasket material by placing wall means on opposite sides of said mirror, placing support means in engagement with the opposite sides of said mirror inwardly of the peripheral portions of the mirror on which the gasket material is to be wound and thereby supporting said mirror, rotating said mirror and said wall means and said support means, applying a length of said gasket material to said mirror in said groove during said rotation, clamping the gasket material to the rotating mirror by engaging the outer periphery of said gasket material with clamping means, and thereafter removing said support means and loading the mirror-gasket sub-assembly through an inlet opening of a hollow element by engaging the gasket material around the periphery of the mirror with a force applying tool and moving the mirror-gasket sub-assembly relative to said clamping means into said hollow element through said inlet opening by application of axial forces on the gasket material around the periphery of the mirror through said tool.

27. The method of applying a resilient plastic gasket material about the periphery of a fragile element such as a mirror comprising the steps of applying a length of said gasket material sufficient to be wrapped around said mirror without overlap on the periphery of said mirror, and thereafter stretching said length of said gasket material on the periphery of said mirror and moving the ends of said length of said gasket material into abutting engagement to form a continuous band around said mirror.

28. Apparatus for winding a predetermined length of resilient plastic gasket material onto the periphery of a fragile element such as a mirror comprising dispensing means to deliver a predetermined length of gasket material, rotatable support means for said mirror, gasket applying means to support said length of said gasket material adjacent said rotatable support means, actuating means to rotate said rotatable support means and to simultaneously actuate said gasket applying means to drive said gasket material onto said mirror, nozzle means spaced closely adjacent said mirror on said rotatable support means to direct said gasket material onto said mirror, said clamping means operable in conjunction with said rotatable support means and said gasket applying means to clamp successive portions of said gasket material to said mirror around the entire periphery of said mirror.

29. The invention as defined in claim 28 and wherein said gasket applying means comprises a pair of spaced roll means for drivingly engaging said gasket material, slide means mounting said roll means for relative movement between a disengaged position and an engaged position relative to said gasket material, and said actuating means being connected to said slide means to move said roll means to said engaged position upon rotation of said rotatable support means to drive said gasket material onto the periphery of said mirror.

30. The invention as defined in claim 28 and wherein said clamping means comprises a plurality of spaced abutment means, belt means supporting said abutment means, and means to wind said belt means around the periphery of said mirror in abutting engagement with said gasket material during application of said gasket material to said rotating mirror.

31. Apparatus for mounting a resilient plastic gasket on the periphery of a fragile member such as a mirror to form a mirror-gasket sub-assembly and for mounting the mirror-gasket sub-assembly in a housing comprising spaced assembly stations, a loading fixture movable between said assembly stations, gasket applying means provided at one station, plunger means provided in said one station to fixedly compressibly position said mirror-gasket sub-assembly on said loading fixture, transfer means to move said loading fixture to said second station after said mirror-gasket sub-assembly has been compressibly mounted thereon, housing positioning means provided at said second station to locate said housing in alignment with said mirro-compressed gasket sub-assembly on said loading fixture, and plunger means provided at said second station to forcibly remove said mirror-compressed gasket sub-assembly from said loading fixture and compressibly insert said mirror-gasket sub-assembly in said housing.

32. The invention as defined in claim 31 and wherein said loading fixture comprises a member having a tapered passageway extending therethrough, an inlet opening for said mirror-gasket sub-assembly at one end of said passageway, an outlet opening for said mirror-gasket sub-assembly at the other end of said passageway, said plunger means at said first station being movable into said passageway through said inlet opening to retainingly insert said mirror-gasket sub-assembly into said passageway, and said plunger means at said second station being movable into said passageway through said inlet opening to expel said mirror-compressed gasket sub-assembly directly into said housing from said passageway through said outlet opening.

33. The invention as defined in claim 31 and wherein said loading fixture comprises a passageway having a tapering wall means extending between an inlet opening and an outlet opening, said inlet opening being dimensionally larger than said outlet opening and dimensionally larger than the gasket of said mirror-gasket sub-assembly and larger than said mirror, said outlet opening being dimensionally smaller than said gasket and dimensionally larger than said mirror, said passageway and said inlet opening and said outlet opening having a peripheral configuration corresponding to said mirror-gasket sub-assembly to cause uniform compression of said gasket during passage of said mirror-gasket sub-assembly through said passageway.

34. The invention as defined in claim 33, and wherein said plunger means at the first station is provided with force applying tool means engageable only with said gasket to move said mirror-gasket sub-assembly through said passageway by application of axial forces on the periphery of said gasket around the periphery of said mirror.

35. Apparatus for mounting a resilient plastic gasket about the periphery of a fragile element such as a mirror to form a mirror-gasket sub-assembly and for mounting the mirror-gasket sub-assembly in a housing by movement through an opening in said housing smaller than said gasket comprising rotatable support means for said mirror, centering means for aligning said mirror in a predetermined manner on said rotatable support means, plunger means for moving said mirror and said rotatable support means between extended and retracted positions, gasket applying means operative in the retracted position to mount a length of gasket on said mirror on said rotatable support means, fixture means for retainingly receiving said mirror-gasket sub-assembly from said plunger means by simultaneous axial displacement of said mirror-gasket sub-assembly and compression of the periphery of said gasket, reciprocable transfer means for moving said fixture means between first and second spaced positions, said fixture means being cooperatively aligned with said plunger means in one of said positions in spaced relationship with said mirror-compressed gasket sub-assembly on said rotatable support means, and housing holding means for fixedly supporting a housing cooperatively aligned with said fixture means in the other of said positions, and plunger means operable in said other position for engaging said mirror-compressed gasket sub-assembly within said fixture and forcing said mirror-gasket sub-assembly from said fixture means into said housing in a compressed state.

36. Apparatus for mounting a resilient plastic gasket on the periphery of a fragile member such as a mirror to form a mirror-gasket sub-assembly and for mounting the mirror-gasket sub-assembly in a compressibly retained position in a groove in a housing comprising gasket applying means for mounting a length of said resilient plastic gasket on the periphery of said mirror, dispensing means for positioning said length of resilient plastic gasket adjacent said gasket applying means, winding means to wind said length of resilient plastic gasket on said mirror, drive means operable to move said resilient plastic gasket into operative engagement with said winding means, actuating means for said drive means connected to said winding means to actuate said drive means in conjunction with actuation of said winding means, holding means for said housing, transfer means movable between said winding means and said holding means, fixture means carried by said transfer means to receive and compressibly retain said mirror-gasket sub-assembly and to move said mirror-compressed gasket sub-assembly from said winding means to said holding means, fixture loading means to position said mirror-compressed gasket sub-assembly on said fixture means, and housing loading means for removing said mirror-compressed gasket sub-assembly from said fixture and compressibly positioning said mirror-gasket sub-assembly in said housing.

37. The apparatus as defined in claim 36 and having pressure means effective on said gasket during movement of said mirror-gasket sub-assembly from said winding means to said housing to apply compressive forces on said gasket to maintain said gasket in predetermined relationship with said mirror.

(References on following page)

References Cited by the Examiner

UNITED STATES PATENTS

| | | |
|---|---|---|
| 2,003,412 | 6/1935 | Alden et al. ———— 29—235 X |
| 2,008,772 | 7/1935 | Robertson ———— 29—235 X |
| 2,056,024 | 9/1936 | Stuart. |
| 2,138,144 | 11/1938 | Dodge ———— 29—235 |
| 2,548,556 | 4/1951 | Ogren. |

FOREIGN PATENTS

| | | |
|---|---|---|
| 808,178 | 1/1937 | France. |
| 503,308 | 4/1939 | Great Britain. |

CHARLIE T. MOON, *Primary Examiner.*

WHITMORE A. WILTZ, *Examiner.*